Dec. 30, 1930.    C. WARNER    1,786,468
WATER SYSTEM
Filed Nov. 25, 1925    3 Sheets-Sheet 2

Inventor
Clarence Warner
By Spencer Sewall and Hardman
his Attorneys

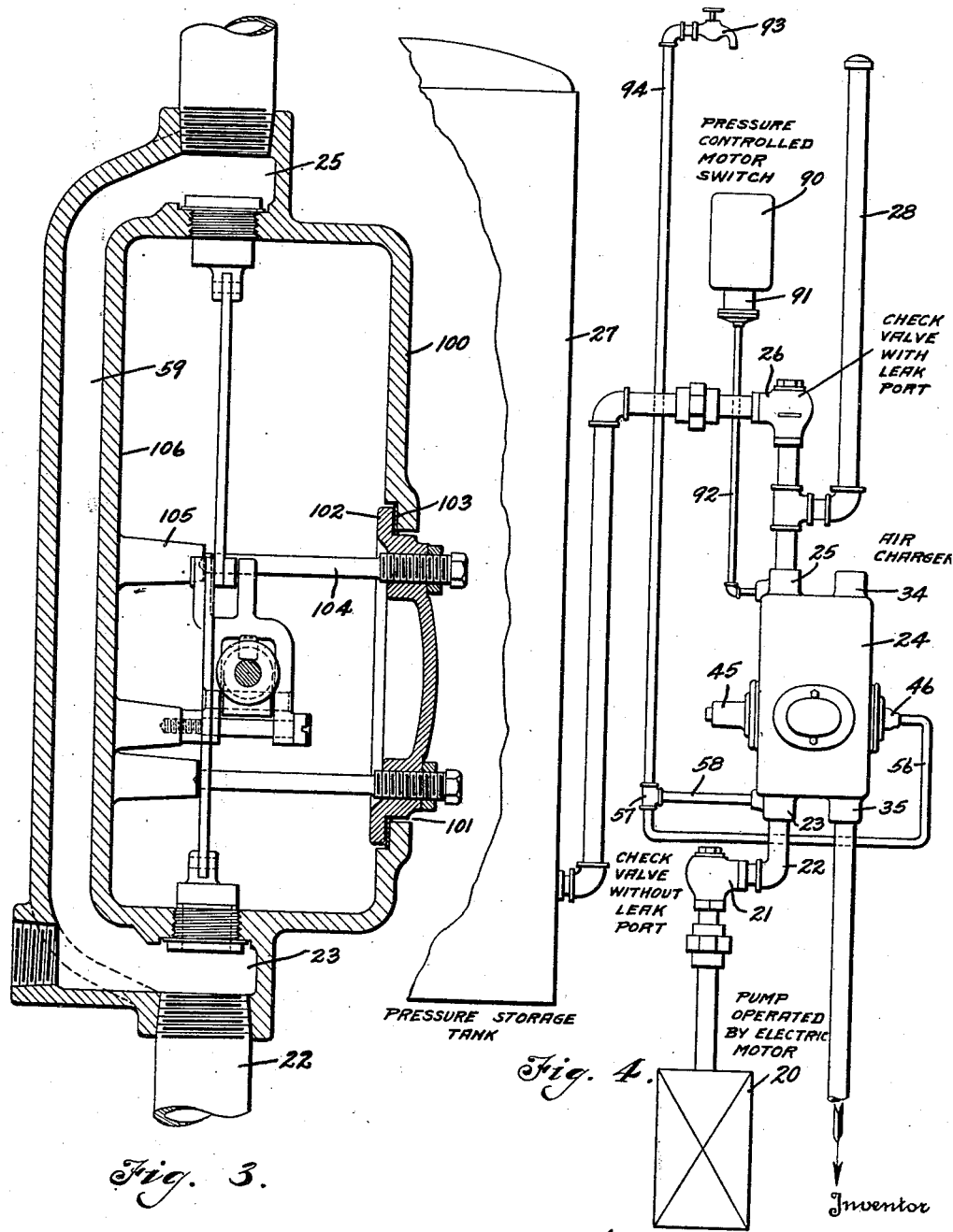

Patented Dec. 30, 1930

1,786,468

UNITED STATES PATENT OFFICE

CLARENCE WARNER, OF DAYTON, OHIO, ASSIGNOR TO DELCO LIGHT COMPANY, OF DAYTON, OHIO, A CORPORATION OF DELAWARE

WATER SYSTEM

Application filed November 25, 1925. Serial No. 71,504.

This invention relates to water systems which include a pump and a storage tank into which water is delivered by the pump and stored under air pressure, and an air charger including an auxiliary tank in which a quantity of air is trapped and is moved into the storage tank by the water pressure in the system in order to compensate for the air in the storage tank which has been absorbed by the water therein.

One of the objects of the present invention is to provide a mechanism which is responsive to the pressure in the system for causing air to be trapped in the charger tank and to be delivered to the storage tank by pressure in the system. In the present invention this object is accomplished by providing a valve mechanism which, in response to a certain high pressure in the system will cause air to be accumulated in the charger tank, and which, at a certain low pressure in the system will cause the air in the charger tank to be trapped and the tank to be connected between the pump and the storage tank so that the air therein will be moved into the storage tank by the water which is forced by the pump through the charger tank.

The invention is operative in a water system in which the pump is controlled manually but it is especially adapted for operation in a system in which the pump is caused to operate when the pressure in the storage tank falls below a certain value and in which the pump ceases operating when the pressure in the storage tank exceeds a certain value.

Further objects and advantages of the present invention will be apparent from the following description, reference being had to the accompanying drawings, wherein a preferred form of embodiment of the present invention is clearly shown.

In the drawings:

Fig. 3 is a sectional view on the line 3—3 of Fig. 1.

Fig. 4 is a diagrammatical side view of a water system embodying the present invention.

Figure 1:
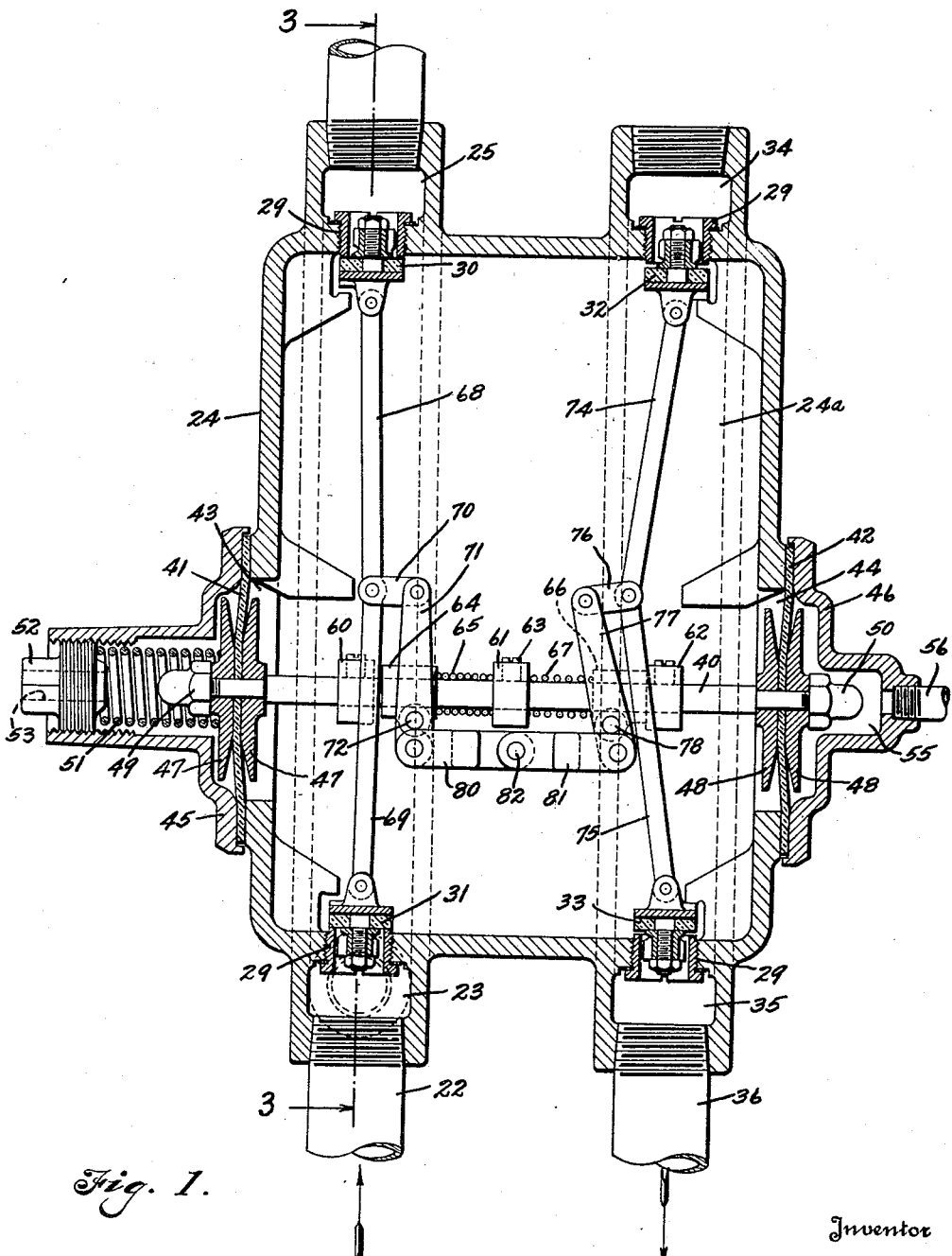
Figs. 1 and 2 are vertical sectional views of the air charger showing the valve mechanism in different operating positions.

Referring to Fig. 4 of the drawing, 20 designates a pump which is operated preferably by an electric motor and is connected as shown with a check valve 21 connected by a pipe 22 with the inlet 23 of an air charger tank 24. The outlet 25 of tank 24 is connected as shown through a check valve 26 with a pressure storage tank 27. The check valve 26 is provided with a leak port which is formed by slotting the valve seat or by providing a small orifice in the valve. The purpose of the leak port will be described later. The air charger outlet 25 and the check valve 26 are connected with a vertical pipe 28 closed at its upper end.

Figure 2:
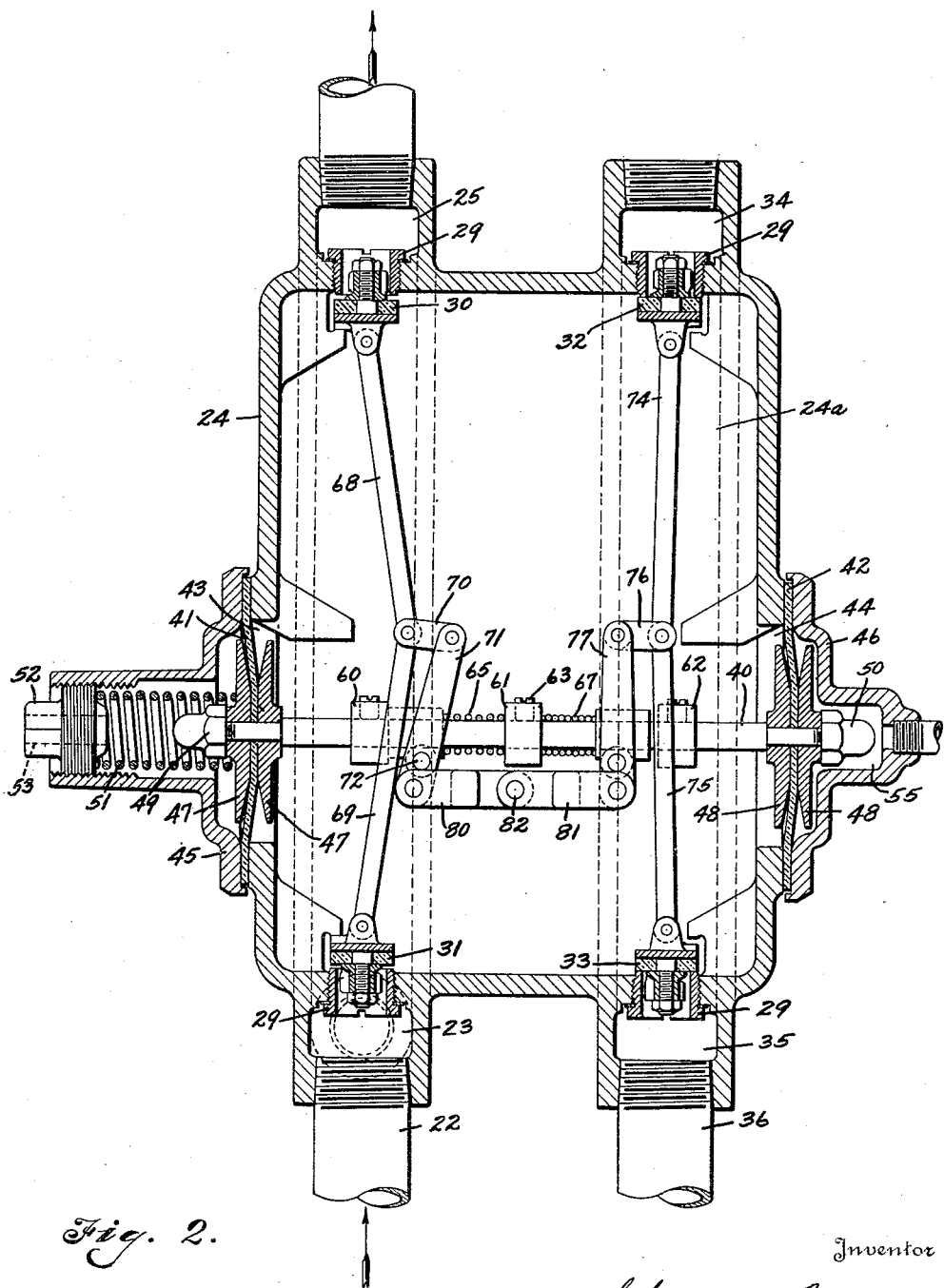

Referring to Fig. 1 the charger tank 24 is provided with ported valve seats 29 each of which cooperates with one of the valves 30, 31, 32 and 33. The valve 31 controls the admission of water from the inlet 23 to the tank 24 and the valve 30 controls the passage of water and air from the tank 24 into the tank outlet 25. The valve 32 controls the passage of air through an air inlet 34 into the tank, and the valve 33 controls the draining of water from the tank through the valve seat 29 and tank drain passage 35 and drain pipe 36. By mechanism responsive to pressure in the system the valves 30 and 31 are closed and then the valves 32 and 33 are opened when the pressure in the system exceeds a certain amount. This condition is shown in Fig. 1. When the pressure in the system decreases to a certain amount the valves 32 and 33 will be closed and a still further decrease will cause the valves 31 and 32 to be opened. This condition of the valves is shown in Fig. 2. When the valves are located as shown in Fig. 1 the tank 27 is disconnected from the air storing chamber 24a of the tank 24 and the latter is connected with atmosphere and with a drain so that any water therein may drain and air may enter the chamber. When the valves are located as shown in Fig. 2 the air chamber 24a is disconnected from the vent and the drain so that the air is trapped therein, and is connected between the pump and the pressure storage tank so that water flowing from the pump to the tank will force the air in the chamber out through the tank outlet 25 past check valve 26 and into the storage tank 27.

The mechanism for operating the valves includes a rod 40 which is supported by flexible diaphragms 41 and 42 which cover openings 43 and 44 respectively in the side walls of the tank 24. Diaphragm 41 is clamped between the tank 24 and a cover 45. And the diaphragm 42 is clamped between the tank 24 and a cover 46. The ends of the rod 40 extend through aligned apertures in washers 47 and 48 and apertures in the diaphragms 41 and 42 and the threaded ends of the rod 40 cooperate with nuts 49 and 50 for securing the rod to the diaphragms 41 and 42, whereby the rod 40 and the diaphragms move together as a unit. The rod 40 is moved toward the right as viewed in Figs. 1 and 2 by spring 51 which is located within the cover 45 and between the washer 47 and a plug 52 threaded into the cover 45 and adjustable for the purpose of adjusting the compression of the spring 41. The plug is provided with a hole 53 so that the air pressure within the cover 45 will be the same as the surrounding atmosphere. The cover 46 and the diaphragm 42 provide a pressure chamber 55 which is connected by pipe 56 with a T 57 which is connected by a pipe 58 to the tank in the passage 23. The passages 23 and 25 are connected by a passage 59 provided by the tank 24 shown more clearly in Fig. 3. Since the check valve 26 is provided with a leak port it is apparent that the pressure in the chamber 55 will vary in accordance with the pressure in the storage tank 27.

Rod 40 supports collars 60, 61 and 62 which may be secured in a desired position of adjustment along the rod 40 by set screws 63. The rod 40 supports a sleeve 64 which is slidable between the collars 60 and 61. A spring 65 located between the sleeve 64 and the collar 61 tends to move the sleeve 64 toward the collar 60. A sleeve 66 is slidable along the rod 40 between the collars 61 and 62. A spring 67 tends to move the sleeve 66 toward the collar 62. The valves 30 and 31 are connected respectively with toggle links 68 and 69 which are connected by a link 70 with a lever 71 which is pivotally supported at 72 by the sleeve 64. The valves 32 and 33 are connected respectively with links 74 and 75 which are connected together with a link 76 which is connected with a lever 77 which is pivotally supported at 78 by the sleeve 66. The levers 71 and 77 are connected, respectively, with links 80 and 81 which are connected together at 82.

When the pressure in the system exceeds a certain amount the diaphragm 42 will be located as shown in Fig. 1 thereby causing the valves 30 and 31 to be maintained closed and the valves 32 and 33 to be open. The air receiving chamber 24a within the tank 24 will be connected with atmosphere and drain so that it may be completely filled with air. As the pressure in the system decreases the diaphragm 42 will move from the position shown in Fig. 1 toward the position shown in Fig. 2. As the rod 40 moves from the position shown in Fig. 1 toward the right the collar 61 will move toward the right and will transmit motion through the spring 67 to the sleeve 66 thereby causing the sleeve 66 to move the fulcrum of the lever 77 toward the right. While this is happening spring 65 will be released somewhat but there will be sufficient compression in spring 65 to maintain the sleeve 64 in the position shown in Fig. 1 at least until the sleeve 64 is engaged by the collar 60 during the motion of the rod 40 toward the right. The space between the collar 60 and the sleeve 64 which is shown in Fig. 1 is sufficient to permit movement of the sleeve 66 a distance toward the right, before the sleeve 64 is moved toward the right, which distance is sufficient to produce a movement of the lever 77 which will cause the toggle links 74 and 75 to move into the position shown in Fig. 2 thereby closing the valves 32 and 33. Therefore it is apparent that the valves 32 and 33 are closed before valves 30 and 31 are open. After the valves 32 and 33 are closed in the manner described further decrease in the pressure in the chamber 55 allowing the spring 51 to move rod 40 further to the right will cause the collar 60 to engage the sleeve 64 and to move the same toward the right so that finally the valves 30 and 31 will be open as shown in Fig. 2. When this occurs water may flow from the pump through the pipe 22, inlet passage 23, valve seat 29 past the valve 31 thereby forcing the air trapped in the air chamber 24a out past the valve 30 and thence into the storage tank 27. In this manner a quantity of air is delivered into the storage tank each time there is a variation in pressure between certain limits. After the pressure in the tank is increased to a certain high value, through the mechanism described the rod 40 will be moved to the left and the valves 30 and 31 will be closed before the valves 32 and 33 are opened. While valves 30 and 31 are closed water may pass from the pump to the tank through the passage 59 provided by the air charger.

The front wall 100 of the air charger 24 is provided with an opening 101 through which the valve mechanism may be introduced within the chamber 24a and through which the mechanism may be adjusted. The opening 101 is closed by a cover 102 sealed by a gasket 103. The cover and hole are elliptical so that the cover may be introduced through the opening. The cover is urged outwardly against the inner surface of the wall 100 by screws 104 threaded through the cover 102 and bearing against lugs 105 provided by the back wall 106 of the air charger.

The present invention may be operated in a water system in which the pump is started and stopped manually, but can be used advantageously in which the pump is started and stopped automatically in response to certain high and low pressure respectively in the storage tank. To accomplish this the pump is operated preferably by an electric motor controlled by a switch 90 which includes a pressure chamber 91 connected by a pipe 92 with the air charger outlet 25. As construction and operation of pressure controlled switches are well known to those skilled in the art, further illustration of this switch is deemed unnecessary to the understanding of the present invention. It is believed sufficient to say that the switch 90 will close the motor circuit when a certain low pressure exists in the chamber 91 and the switch will open when a certain high pressure in the chamber is reached.

When the present invention is used in a pumping system in which the motor is controlled by a pressure operated switch the spring 51 is adjusted so that the valves of the air charger will be moved in the position shown in Fig. 2 by the time that the switch has been closed to cause the pump to operate and so that the valves will be moved in the position shown in Fig. 1 at or before the pressure in the system is reached which will cause the pump to stop operating. In this way the automatic operation of the air charger valves is coordinated with the automatic control of the pump motor so that when the pump starts to operate the air charger is in condition for trapping a quantity of air and for causing water to flow from the pump through the air chamber of the charger and into the storage tank; and when the pump ceases operating and the high limit of pressure in the system has been reached the valves will have been located as shown in Fig. 1 so that the air chamber is disconnected from the air pump and storage tank and is connected with a vent and a drain.

The present invention is also adapted to be used with a water system in which the pump is automatically started by the turning on of the faucet from which fresh water is to be drawn directly from the well in addition to starting the pump automatically in response to the certain low pressure in the storage tank. In such a system the pump is stopped automatically by the turning off of the fresh water faucet and unless, however, there is low pressure existing in the storage tank such as would cause the pump to continue to operate until a certain high pressure is created in the storage tank.

In Fig. 4, 94 designates a faucet which is connected with a fresh water line which includes the pipe 94, T 58, passage 23, pipe 22, check valve 21. Whenever the faucet 93 is open to obtain fresh water the pressure in the pipe 92 will diminish rapidly since the full capacity of the passages connected with pipes 94 and 92 is much greater than the full capacity in the leak port in the check valve 26 therefore the pressure in the switch chamber 91 will diminish quickly which will cause the switch to be closed and the pump motor to operate. The closing of the faucet 93 will cause the pressure into the system to increase and the switch to be opened.

It will be noted, however, that the starting and stopping of the pump in response to the opening and the closing, respectively, of the faucet 93 will not cause the storage tank 27 to receive an additional quantity of air. The opening of the faucet will, however, cause the charging chamber to be disconnected from the air vent and the drain so that water under pressure in the system will not be discharged through the drain during the operation of the pump. The opening of the faucet 93 causes the pressure in the chamber 55 to be reduced thereby permitting the spring 51 to move the valve mechanism into the position shown in Fig. 2. During the operation of the pump to supply fresh water by the faucet 93 the water in the pipe 22, the excess of that required for supplying the demand for fresh water, will flow through the passage 59 and some of this water may even enter the charger tank 24a. The air in the chamber 24a will not be moved past the check valve 26 due to the greater pressure in the storage tank 27. When the faucet is closed the pressure in the chamber 55 will increase so that the valve mechanism is restored to the position shown in Fig. 1. After that the water which may have entered the chamber 24a may be drained. Although the air charging apparatus provides a connection between the pump outlet on the drain while the pump is idle, this drain connection is automatically interrupted by the opening of the fresh water faucet so that none of the water supplied by the pump will be used while there is a demand for fresh water.

While the form of embodiment of the present invention as here disclosed, constitute a preferred form, it is to be understood that other forms might be adopted, all coming within the scope of the claims which follow.

What is claimed is as follows:

1. A water system comprising, in combination, a pump, a pressure storage tank, an air charger tank, a motor for operating the pump, a motor controller responsive directly to a certain high pressure in the system for causing the pump to stop and responsive to a certain low pressure in the system for causing the pump to operate, and means independent of said controller responsive to a high pressure for causing the charger tank to receive air and responsive to a low pressure for causing air to be trapped in the charger tank and the charger tank to be connected with the pump and storage tank.

2. Air charging apparatus for a water system including a reservoir and a conduit for supplying water thereto comprising in combination a chamber adapted to be connected between the conduit and the reservoir, the chamber having a vent port, a drain port, a port for communicating with the conduit and a port for communicating with the reservoir and means for closing the drain port and afterward opening the ports to the conduit and reservoir.

3. Air charging apparatus for a water system including a reservoir and a conduit for supplying water thereto comprising in combination a chamber adapted to be connected between the conduit and the reservoir, the chamber having a vent port, a drain port, a port for communicating with the conduit and a port for communicating with the reservoir and means for closing the first two ports and afterward opening the other two ports.

4. Air charging apparatus for a water system including a reservoir and a conduit for supplying water thereto comprising in combination a chamber adapted to be connected between the conduit and the reservoir, the chamber having a vent port, a drain port, a port for communicating with the conduit and a port for communicating with the reservoir and means for simultaneously closing the first two ports and afterward simultaneously opening the second two ports.

5. Air charging apparatus for a water system including a reservoir and a conduit for supplying water thereto comprising in combination a chamber adapted to be connected between the conduit and the reservoir, the chamber having a vent port, a drain port, a port for communicating with the conduit, a port for communicating with the reservoir, a pair of valves controlling the first two ports, a toggle having the free ends of its links attached to the valves, a second pair of valves for controlling the other two ports, a second toggle similarly connected to the second pair of valves, and means for straightening either toggle to close the valve associated therewith and for breaking the other toggle to open the valves associated therewith.

6. Air charging apparatus for a water system including a reservoir and a conduit for supplying water thereto comprising in combination a chamber adapted to be connected between the conduit and the reservoir, the chamber having a vent port, a drain port, a port for communicating with the conduit, a port for communicating with the reservoir, a pair of valves controlling the first two ports, a toggle having the free ends of its links attached to the valves, a second pair of valves for controlling the other two ports, a second toggle similarly connected to the second pair of valves, and means for straightening one toggle to close the valves associated therewith while permitting the other toggle to remain unbroken and for thereafter breaking the other toggle to open the valves associated therewith without disturbing the first mentioned toggle.

7. A system such as defined by claim 6 in which the toggle operating means includes levers each connected with the joint of the toggle, movable fulcrum blocks each pivotally supporting one of the levers, a device directly connecting certain arms of the levers, and means for moving one of the fulcrum blocks toward the position for straightening the toggle while permitting the other fulcrum block to remain in position for causing the toggle connected therewith to be straightened, and then for causing the second mentioned fulcrum block to be moved into position for breaking the toggle connected therewith.

8. A system such as defined by claim 6 in which the toggle operating means includes levers each connected with the joint of the toggle, movable fulcrum blocks each pivotally supporting one of the levers, link mechanism directly connecting certain arms of the levers, and means for operating the fulcrum blocks and including an actuating member, springs each transmitting motion from the actuator to the blocks in a direction for straightening the toggles, and members each for transmitting motions non-yieldingly from the actuator to the blocks in a direction for breaking the toggles.

9. A system such as defined by claim 6 in which the toggle operating means includes levers each connected with the joint of the toggle, movable fulcrum blocks each pivotally supporting one of the levers, link mechanism directly connecting certain arms of the levers, an endwise movable rod upon which the fulcrum blocks are slidably mounted, a collar fixed to the rod between the blocks, springs each located between the collar and a block for transmitting motion from the rod to a block in a direction for straightening the toggle to close the valves connected therewith under yielding pressure, and other collars fixed to the rod and located so that motion will be transmitted from the rod to a block unyieldingly in the direction for breaking the toggle connected therewith.

10. A system such as defined by claim 6 in which the toggle operating means includes springs each for transmitting motion to the joint of a toggle in a direction to straighten the toggle and includes means for non-yieldingly transmitting motion to the joint of a toggle in a direction to break the toggle.

11. Air charging apparatus for a water system including a reservoir and a conduit for supplying water thereto comprising in combination a chamber adapted to be connected between the conduit and the reservoir, the chamber having a vent port, a drain port, a port for communicating with the conduit and a port for communicating with the reservoir, a pair of valves controlling the first two ports, a toggle having the free ends of its links attached to the valves, a second pair of valves for controlling the other two ports, a second toggle similarly connected to the second pair of valves, and means for alternately straightening one toggle and breaking the other toggle on the one hand and breaking the first toggle and straightening the second toggle on the other hand to operate the valves associated with the toggles.

12. Air charging apparatus for a water system including a reservoir and a conduit for supplying water thereto comprising in combination a chamber adapted to be connected between said conduit and the reservoir, valves movable to given positions for causing the chamber to be drained and filled with air and movable into other positions for trapping the air in the chamber and connecting the chamber between the conduit and reservoir, and means for operating the valves including a rod within the chamber, flexible diaphragms supported by opposite walls of the chamber and supporting the rod, a pressure chamber on the outside of and defined by one of said diaphragms for connection to a source of pressure responsive to the pressure in the reservoir, means for yieldingly resisting movement of the rod due to pressure in said pressure chamber, and means for actuating the valves in response to movement of the rod.

13. A water system comprising, in combination, a pump, a motor for operating the pump, a fresh water line including a faucet connected with the pump, a pressure storage tank connected with the pump, means responsive to the opening of the fresh water faucet for causing the motor to operate and to the closing of said faucet for causing the motor to stop, said means being also responsive to a certain low pressure in the storage tank for causing the motor to operate and responsive to a certain high pressure in the storage tank for causing the motor to stop, and air charging apparatus responsive only to said certain low pressure in the storage tank for causing the storage tank to receive additional air.

14. Air charging apparatus for a water system including a reservoir and a conduit for supplying water thereto comprising in combination a chamber adapted to be connected between the conduit and the reservoir, the chamber having a vent port, a drain port, a port for communicating with the conduit and a port for communicating with the reservoir and means including a common operating member for closing the drain port and afterward opening the ports to the conduit and reservoir.

15. Air charging apparatus for a water system including a reservoir and a conduit for supplying water thereto comprising in combination a chamber adapted to be connected between the conduit and the reservoir, means within the chamber for draining and venting the chamber and for trapping air within the chamber and connecting the chamber between the conduit and the reservoir, a flexible diaphragm in a wall of the chamber for operating said means, a pressure chamber outside of and defined by the diaphragm for connection to a source of pressure responsive to the pressure of the reservoir and means for balancing the pressure of the reservoir on said diaphragm within the first mentioned chamber.

16. Air charging apparatus for a water system including a reservoir and a conduit for supplying water thereto comprising in combination a chamber adapted to be connected between the conduit and the reservoir, means within the chamber for draining and venting the chamber and for trapping air within the chamber and connecting the chamber between the conduit and reservoir, a flexible diaphragm in a wall of the chamber for operating said means, a pressure chamber outside of and defined by the diaphragm for connection to a source of pressure responsive to the pressure of the reservoir on said diaphragm within the first mentioned chamber, said means including a flexible diaphragm whose area is equal to the area of the first mentioned diaphragm disposed in a wall of the chamber opposite to the first mentioned diaphragm, and means connecting said diaphragms.

In testimony whereof I hereto affix my signature.

CLARENCE WARNER.

CERTIFICATE OF CORRECTION.

Patent No. 1,786,468.                            Granted December 30, 1930, to

CLARENCE WARNER.

It is hereby certified that error appears in the printed specification of the above numbered patent requiring correction as follows: Page 3, line 122, claim 1, strike out the word "directly"; and that the said Letters Patent should be read with this correction therein that the same may conform to the record of the case in the Patent Office.

Signed and sealed this 3rd day of February, A. D. 1931.

M. J. Moore,
(Seal)                                                                          Acting Commissioner of Patents.